United States Patent [19]

Bednar

[11] Patent Number: 5,095,464
[45] Date of Patent: Mar. 10, 1992

[54] HYDROPHONE CHECKER
[75] Inventor: Eugene D. Bednar, Houston, Tex.
[73] Assignee: Shell Oil Company, Houston, Tex.
[21] Appl. No.: 108,874
[22] Filed: Oct. 15, 1987
[51] Int. Cl.[5] .................................. H04B 17/00
[52] U.S. Cl. ............................................ 367/13
[58] Field of Search ...................... 367/13; 73/1 DV
[56] References Cited

U.S. PATENT DOCUMENTS

| | | | |
|---|---|---|---|
| 4,015,202 | 3/1977 | Fredriksson et al. | 367/13 |
| 4,134,097 | 1/1979 | Cowles | 367/13 |
| 4,320,468 | 3/1982 | Montross | 367/13 |
| 4,375,679 | 3/1983 | Park, Jr. et al. | 367/13 |
| 4,468,760 | 8/1984 | Zalesak et al. | 367/13 |
| 4,757,706 | 7/1988 | Doggett | 367/13 |

Primary Examiner—Daniel T. Pihulic

[57] ABSTRACT

A checker is provided that attaches to a seismic streamer cable section and provides an audible output in response to a pressure pulse when the polarity of the hydrophones in that cable section are correct. Methods for checking a hydrophone and its polarity and alternative apparatus are also provided.

10 Claims, 3 Drawing Sheets

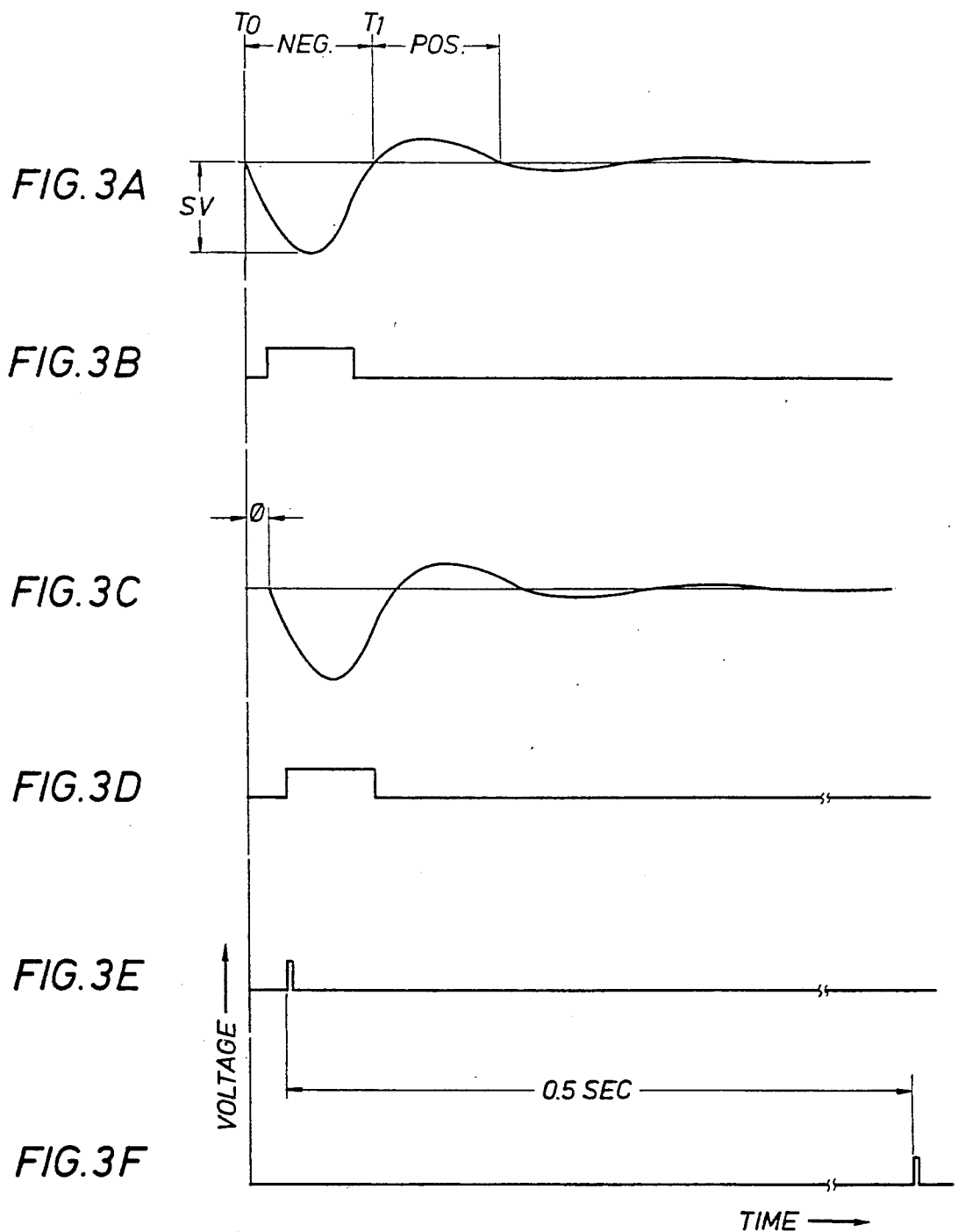

HYDROPHONE CHECKER

CROSS-REFERENCE TO SIMULTANEOUSLY FILED RELATED APPLICATION

"Geophone Checker", Eugene D. Bednar, Ser. No. 108,873.

BACKGROUND OF THE INVENTION

This invention relates to methods and apparatus for determining the polarity of a hydrophone, and more particularly, relates to methods and apparatus for determining the polarity of hydrophones mounted in marine seismic streamer cables.

A conventional hydrophone typically consists of a piezioelectric material mounted to allow the material to compress and dilate in response to a pressure field incident on the material. Wires attached to the exterior and interior surfaces of the material may be connected to external terminals of the hydrophone, and for one convention one terminal is marked with a dot of paint or a plus sign to indicate a positive polarity. However, many hydrophones may have color coded leads (blue and red) instead of external terminals. For either of such conventions, positive voltage is produced on the plus terminal or red colored lead when the hydrophone experiences a positive pressure, and the voltage is proportional to the relative strength of the pressure.

In seismic exploration the use of an array of hydrophones in a seismic cable to record the pressure fluctuations at various survey locations resulting from waterborne pressure sources is customary. The hydrophones may be connected in series, parallel, or a combination of series and parallel, depending upon acquisition factors. Correct polarity of each hydrophone is important so that the detector array response is the true sum of all the hydrophone elements. Detection of individual hydrophone polarities once assembled in a seismic streamer cable, i.e. an array, is at best a difficult problem.

Traditionally, hydrophone polarity has been determined with the use of a zero center scale galvanometer (or a microammeter) in an enclosed facility used to assemble or repair hydrophone cables. A hydrophone is connected to the galvanometer. When the hydrophone's exterior surface is pulsed by a pressure wave, the galvanometer deflects either plus or minus. A positive deflection of the galvanometer should occur if the hydrophone plus terminal or lead is connected to the plus terminal of the galvanometer. If the positive hydrophone terminal or lead is incorrectly marked, the galvanometer will have a negative deflection. Also, if the positive hydrophone terminal or lead is incorrectly marked the marking must be changed to reflect the actual positive terminal or lead.

Further, an oscilloscope may be used to replace the galvanometer and the transient displacement of the electron beam (i.e. output voltage of the hydrophone) indicates the polarity when a hydrophone is impulsed. If a digital storage oscilloscope or other recording device is used, then the transient deflection can be stored for later analysis. However, the use of oscilloscopes in the field (e.g. on a boat deck) to check the polarities of hydrophones installed in cables is not very practical due to the size and bulk of an oscilloscope, as well as its need for power.

Both of these methods require extreme care in handling, a lot of judgement, and attention to detail by the observer to determine the proper polarity and are not readily amenable to use in the field to test individual hydrophones, either uninstalled or installed in a cable. Thus, testing of hydrophones for polarity once installed in streamer cables for field acquisition is not practical using these methods. In addition, the testing of individual hydrophones for polarity before installation in a cable is a tedious procedure requiring attention to detail, as previously noted herein.

These and other limitations and disadvantages of the prior art are overcome by the present invention, however, and methods and apparatus are provided for determining and/or checking a hydrophone for proper polarity.

SUMMARY OF THE INVENTION

In a preferred embodiment of the present invention, methods and apparatus are provided for determining and/or checking the polarity of a hydrophone, whether or not it is installed in a seismic cable, either in the field or in a repair facility. More particularly, the presently preferred apparatus of the present invention employs a charge amplifier and/or amplifier to condition and amplify the hydrophone signal and then the amplified hydrophone signal is split and connected to both a phase shifter (delay) and a first level detector. The output of the phase shifter is rectified and provided via a second level detector as one input to a comparator with the other input to the comparator being that of the first level detector. The comparator determines if the polarity of the hydrophone markings is correct from its two inputs. The comparator in turn is interconnected with an adjustable timer and output switch or amplifier. The timer determines the amount of time for which an output signal is produced from the output amplifier in response to a signal from the comparator that the polarity is correct. The output amplifier is in turn connected to an output device, which may be an audible and/or visual device, for providing an appropriate signal or indication only when the polarity of the hydrophone is correct. The output device may also have an adjustable signal level for adjustment of "volume" or "brightness" based upon use in the field or an enclosed facility.

The presently preferred method of the present invention generates an output signal from a hydrophone by an appropriate pressure pulse, amplifies this output signal, automatically compares the output signal and polarity of the hydrophone with the expected signal and polarity of a similar hydrophone having the proper polarity receiving the same pressure pulse, and generates a final signal indicative of correct polarity and/or signal of the tested hydrophone. This may be accomplished by taking the amplified hydrophone signal and dividing it into two signals. One portion of the signal is phase shifted (delayed), rectified and its amplitude compared to a first preselected value; the amplitude and polarity of the second portion of the signal is compared to a second preselected value and preselected polarity. If the amplitude of the first signal (i.e. the delayed, rectified portion) exceeds the first preselected value, a third signal is generated. If the amplitude of the second signal (i.e. the second portion) exceeds the second preselected value and has the same polarity as the preselected polarity, a fourth signal is generated. These third and fourth signals are compared and if both are present, a fifth signal is generated. The fifth signal causes a final output signal which may be an audible and/or visual signal, for a preselected time.

Alternatively, a method of the present invention generates an output signal from a hydrophone by an appropriate pressure pulse, amplifies that output signal, and then determines the polarity of that signal. The polarity of the signal is compared with the polarity expected for that type of the pressure pulse, and if correct (i.e. the same), automatically generates a signal. This signal causes a final signal indicative of correct polarity for a preselected time.

It is an object of the present invention to provide a simple and portable electronic circuit to quickly and accurately determine and/or check hydrophone polarity either individually or within an array with minimal operator attention or judgement.

It is also an object of the present invention to provide a method for determining the polarity of a hydrophone relative to its indicated or assumed polarity with minimal operator attention or judgement.

It is a specific object of the present invention to provide a method for determining the polarity of a hydrophone which generates an output signal from such a hydrophone by pulsing such a hydrophone with a pressure in a predetermined direction and manner, amplifying the output signal of such a hydrophone, comparing the actual output signal and polarity thereof with the expected signal and polarity from such a hydrophone having a preselected polarity pulsed in the same manner, and generating an output responsive to the comparing step when the output signal and polarity are substantially the same as the expected signal and polarity for such a hydrophone.

These and other features and objects of the present invention will become apparent from the following detailed description, wherein reference is made to the figures and accompanying drawings.

IN THE FIGURES

FIGS. 3A-3F depict various expected wave forms from a hydrophone at various points of the circuitry depicted in FIG. 2.

DETAILED DESCRIPTION

Figure 1:
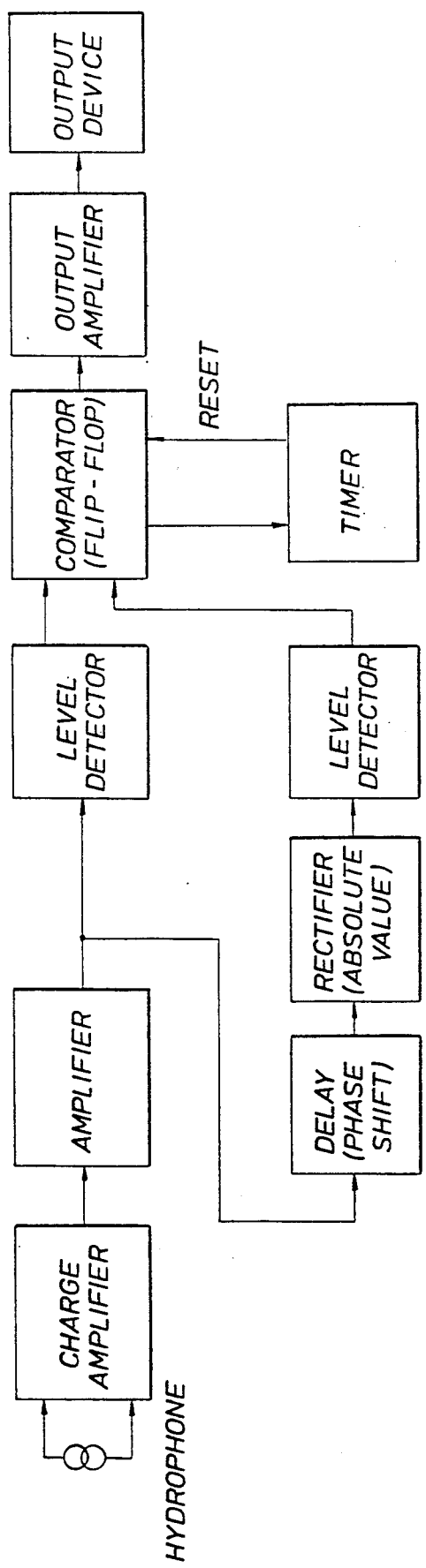
FIG. 1 is a simplified block diagram of a hydrophone polarity detector of the present invention.

Referring now to FIG. 1, there may be seen a simplified block diagram of a presently preferred hydrophone polarity checker of the present invention. More particularly, there may be seen a hydrophone appropriately connected to a hydrophone checker block diagram in a manner consistent with either the hydrophone's marked polarity or an assumed polarity. The hydrophone checker is seen to be initially connected to the hydrophone by a charge amplifier followed by an amplifier block.

Although the hydrophone checker of the present invention preferably employs a charge amplifier as the input for the output signal from a hydrophone, other signal "conditioning" may be used. For example, when hydrophones are used in relatively short cables, the hydrophones may be connected directly to the amplifier; the amplifier should be a fast amplifier in such a case. However, when hydrophones are used in relatively long cables or cables of unknown length, the hydrophone signal must be "conditioned" before any amplification.

The simplest form of signal conditioning is to employ a stepdown transformer with a damping resistor across either the primary or secondary of the transformer. The most general form of conditioning is accomplished by employing a differential charge amplifier, such as that taught in U.S. Pat. No. 4,242,741. This differential charge amplifier automatically adjusts for different cable lengths while maintaining a damping factor of $(2)^{-\frac{1}{2}}$ (i.e. critical damping). The gain of the charge amplifier is determined by the value of the feedback capacitor.

The amplifier (or preamplifier) preferably has an adjustable gain and is used to amplify the conditioned output signal of the hydrophone and should be adjustable to provide various selectable amplifications or provide automatic amplification through AGC or non-linear amplification techniques. In general, the hydrophone signal should be amplified sufficiently to provide a large enough signal for any subsequent level detector with the amount of amplification depending upon the sensitivity of the hydrophone and the amount of amplification during signal conditioning (if any), without amplifying any noise to the point where the noise will exceed the thresholds of a level detector. The separate amplifier block may be omitted if the charge amplifier (i.e. signal conditioning block) also provides sufficient amplification of the hydrophone signal. The amplified hydrophone signal is interconnected with both a (first) level detector block and a delay (or phase shift) block.

The time delayed, amplified hydrophone signal from the phase shift block is supplied as the input to a rectifier block whose output is in turn supplied as the input to a (second) level detector block. The output of the first and second level detector blocks are provided as inputs to a comparator block or flip-flop. The comparator block in turn activates an output amplifier that energizes an output device, which may be an audible and/or visual device, only if the hydrophone polarity is correct. The output level of the output device may be adjustable. The output device is energized for a preselected period of time, which is determined by a timer block, which resets the comparator when the preselected period of time has elapsed; the timer block is preferably adjustable to provide various preselected periods of time. Alternatively, the output amplifier may be eliminated and the comparator may directly activate the output device. Alternatively, the timer block may be part of the output device.

The first level detector block provides a constant voltage signal of a predetermined polarity to the comparator when the amplified hydrophone signal has a first preselected polarity and when the hydrophone signal exceeds a first adjustable preselected threshold voltage level. For example, for an inverting level detector the output polarity may be positive if the input polarity is negative, although any other desired combination of polarities may be employed. For hydrophones, this polarity and threshold may be selected to provide an output signal only during the high amplitude portion of the initial half cycle of the hydrophone signal when the hydrophone case is pulsed by pressure in a preselected direction or manner (i.e., by tapping the top or side of the hydrophone case).

This threshold, once selected for a particular type of hydrophone, may also be employed as a quality control check to ensure that all hydrophones of that type have a similar signal amplitude when pulsed in the predetermined manner (i.e. on the top or side of the hydrophone case, as appropriate) The pressure pulse may be as simple as "shooting" the hydrophone with an airgun (without any ammunition), or as complex as a special injector disposed at the end of a graduated rule to provide a constant repeatable pressure wave at a fixed distance from the hydrophone.

More particularly, the application of a pressure pulse to a hydrophone requires some care and experimentation. For example, some hydrophones are essentially planar material (discs or flatsheets) that give a much better response when "pulsed" on their flat surface, as opposed to their edge. Further, some pressure sources such as an airgun may result in a lot of high frequency noise that is superimposed on the basic pressure pulse. A piece of foam rubber has been found to provide a reproducible pulse (with minimal high frequency noise) for unmounted hydrophones; an unmounted hydrophone is tapped squarely and lightly with a foot long 2-inch square piece of foam rubber. For hydrophones mounted in streamer cables the pressure source may be a small wooden stick that is used to tap the outside of the streamer cable near the hydrophone.

The delay block delays the amplified hydrophone signal a preselected amount of time, which is preferably adjustable. The rectifier block converts the delayed, amplified hydrophone signal into an absolute value signal of preselected and adjustable polarity; i.e., the positive and negative half cycles of the hydrophone signal are converted to all positive or all negative half cycles of the same shape and amplitude as the unrectified signal. The absolute valued, delayed, amplified hydrophone signal is then provided as the input to a second level detector block. This second level detector block may have its input and output polarity preselected and its threshold at a second preselected, adjustable value, as discussed hereinbefore for the first level detector.

The output signals from the first and second level detectors are provided as inputs to a comparator block, where the polarities of the level detectors for the initial half cycle of hydrophone signal following an impulse may be compared. Again, the output polarities of the level detectors may be either positive or negative when their input polarity is appropriate (desired) depending upon the actual circuitry employed or the desires of the operator. See for example, FIG. 3B for the first level detector output signal and FIG. 3D for the second level detector output signal from a hydrophone, and which are discussed later herein. Preferably, if the two signals from the first (FIG. 3B) and second (FIG. 3D) level detectors have the same polarity, the comparator may provide a signal to an output amplifier and a timer; if the two signals from the level detectors have differing polarities, the comparator may provide no signal to the output amplifier and timer. For example, where the comparator is a flip-flop, the output signal from the first level detector may be used as a "D" input to the flip-flop and the (delayed) output signal from second level detector may be used as a "clock" input to the flip-flop; if the two output signals of the level detectors have the same polarity the flip-flop will change state and activate an output amplifier and timer. The "clock" input must be delayed relative to the "D" pulse for the flip-flop to work properly. Thus, the need to delay the signal to the second level detector for the embodiment of FIGS. 1 and 2. However, for comparators that are not a flip-flop or do not employ a flip-flop, this delay may be unnecessary, and if so, the delay block may be eliminated. For hydrophones, it is also necessary to have the comparator reject all but the initial half cycle of the hydrophone signal, this may be accomplished by locking in the first signals or by locking out any subsequent signals.

The output amplifier, in turn activates an output device, which may be an audible and/or visual device, until the comparator signal is removed. The output device may have adjustable output level. The timer allows the comparator to provide its output signal for a preselected, adjustable time before resetting the comparator, and thus removing the comparator signal. Again, the comparator may directly activate the output device which may also contain the timer.

When the hydrophone's electrical and mechanical characteristics are well known, it is possible to eliminate the delay, rectifier, second level detector and comparator blocks of FIG. 1. That is, by appropriate adjustment of the first level detector and amplifier gain, the first level detector provides an output signal to turn on the output amplifier (or output device directly) and a timer when the amplified hydrophone signal has the proper polarity for a pressure pulse in a preselected direction or manner to the hydrophone case and when the amplified hydrophone signal exceeds a preselected amplitude selected to include only the first half cycle of the hydrophone signal. See for example, FIG. 3B for the output of the first level detector based upon the signal depicted in FIG. 3A. The timer serves to reset the output amplifier after a preselected, adjustable time period, that commences with the turning on the output amplifier. Further, the amplifier may be eliminated when the charge amplifier (or other signal conditioning device as noted herein) is adjusted to provide the required amount of amplification of the hydrophone signal.

The presently preferred method of the present invention generates an output signal from a hydrophone by an appropriate pressure pulse in a predetermined direction or manner, conditions and amplifies this signal, automatically compares the signal and polarity of the hydrophone with the expected signal and polarity of a similar hydrophone having a preselected polarity receiving the same pulse, and generates an output signal indicative of correct polarity and/or signal of the tested hydrophone. This may be accomplished by taking the conditioned and amplified hydrophone signal and dividing it into two signals. The first signal is phase shifted (delayed), rectified and its amplitude compared to a first preselected value; the second signal's amplitude and polarity is compared to a second preselected value and preselected polarity. If the amplitude of the first signal exceeds the first preselected value, a comparison or third signal is generated. If the amplitude of the second signal exceeds the second preselected value and has the same polarity as the preselected polarity, a polarity dependent or fourth signal is generated. These third and fourth signals are compared and if both have the proper polarity, or if both are present, a fifth signal is generated. The fifth signal causes a final output signal, which may be an audible and/or visible signal, for a preselected time.

Alternatively, a microprocessor having suitable memory may be programmed to serve as the delay line, rectifier, first and second level detectors, timer and comparator, or as a first level detector and timer, as appropriate. However, the output of either the charge amplifier or amplifier must be digitized with an appropriate analogue-to-digital converter. Further, the microprocessor may also be programmed to compare any actual output signal of a hydrophone with a stored reference signal for that type of hydrophone to perform a quality control check of the type of hydrophone being tested and indicate the results of any such test in an audible and/or visual manner. The stored reference signal may be an appropriate signal resulting from a known good hydrophone of the type being tested; the reference signal may consist of the digitized voltage amplitude and polarity versus time. The comparison program may compare the actual signal with the reference signal (at the same amplifications) and provide appropriate audible and/or visual signals, outputs or results (i.e. a strip chart comparison and analysis) if the two signals vary by more than a preselected amount in either amplitude or time, or both, i.e. if the signals are not substantially the same. The comparison program may need to adjust the amplification of either the output signal or the reference signal to ensure a meaningful comparison, or otherwise allow for comparisons with different amplifications.

Alternatively, a method of the present invention generates an output signal from a hydrophone by a pressure pulse in a predetermined direction or manner, amplifies that output signal, and then determines the polarity of that signal. The polarity of the signal is compared with the polarity expected for that known direction of the pressure pulse, and if correct (i.e. the same), automatically generates a signal. This signal causes a final signal, which may be an audible and/or visual signal indicative of correct polarity, for a preselected time.

The apparatus of the present invention may be employed in the field to individually determine or check the polarity of a hydrophone, or all the hydrophones, in a cable, before, during, or after any field repairs. It may also be used to determine and/or check the polarity of a hydrophone that is not in a cable. The hydrophone polarity apparatus is connected to the wires of a hydrophone array at the end of a streamer cable section or sections. The seismic operator then pulses (as described hereinbefore) each hydrophone one at a time until all hydrophones are verified by an appropriate audible and/or visual signal as being connected with proper polarity or any incorrectly wired hydrophone or hydrophones are isolated. The sound level of an audible device should be adjustable and be set loud enough to be heard a few hundred feet away, making it possible to test any practical streamer cable with the polarity apparatus at the head end connector (ships end of section) for each section of a marine streamer cable. For hydrophones used in a bay cable o shallow water cable, the device would be connected at the take-out locations for each section. Each section is tested in sequence until all sections of a streamer cable are verified.

The apparatus of the present invention may also be employed in land or ship board repair facilities. The cable repair individual simply connects the hydrophone polarity apparatus to each section and pulses each hydrophone one at a time until all hydrophones are verified as having connections with proper polarity by audible and/or visual signals, or any incorrectly wired hydrophone is isolated, as described hereinbefore. Again, the present invention may also be used to determine and/or check the polarity of a hydrophone that is not in a cable.

For example, a single hydrophone may have its polarity determined and/or checked. The individual hydrophone is connected to the hydrophone polarity checker of the present invention in accordance with its indicated or assumed polarity. A pressure pulse to the outside surface of the hydrophone set on a table or desk top will cause an output signal, which may be an audible and/or visual signal, if the marked or assumed polarity is correct. Again, the level of the output signal may be adjusted for the comfort of the operator in such a test room.

Figure 2:
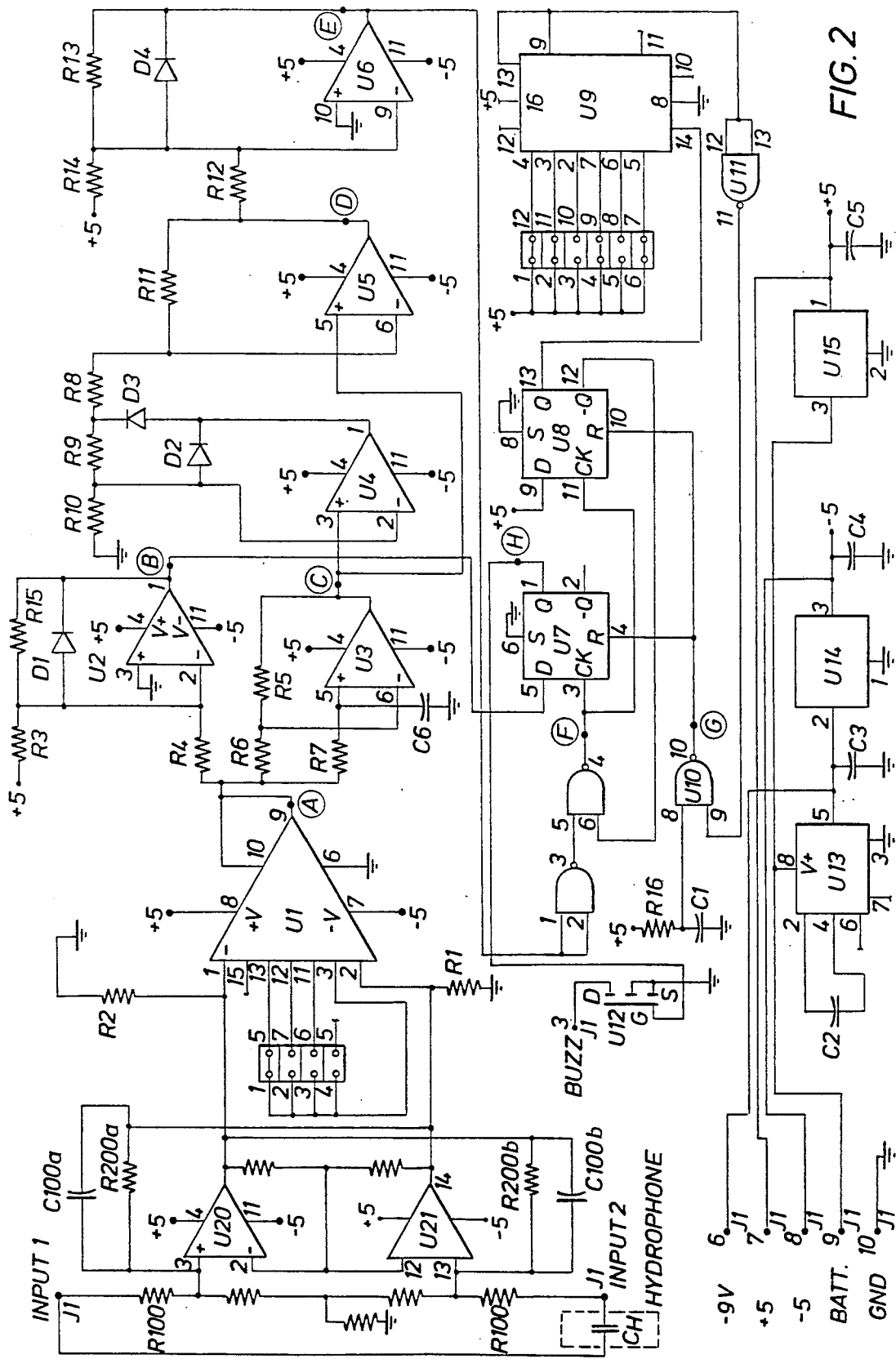
FIG. 2 is a simplified schematic diagram of the preferred hydrophone polarity detector of the present invention.

Referring now to FIG. 2 there may be seen a simplified schematic diagram of the presently preferred embodiment of the hydrophone polarity detector of the present invention for use with hydrophones. Circled test points A-H are depicted in FIG. 2 and the expected waveforms at some of these test points for a hydrophone are depicted in FIGS. 3A-3F, as described later herein. More particularly, there may be seen a hydrophone connected to the inputs of a differential charge amplifier, which consists of operational amplifiers U20 and U21 and associated circuit elements. The hydrophone is connected to the terminals of the differential charge amplifier in accord with its marked or assumed polarity. The gain of the differential charge amplifier may be adjusted by varying the capacitance of the feedback capacitors (C100a, C100b). In particular, the gain, G, is two times the capacitance of the hydrophone ($C_H$ in the dotted box of FIG. 2) divided by the feedback capacitance. The differential charge amplifier serves to automatically adjust for different cable lengths while maintaining critical damping (i.e. a damping factor of $[2]^{-\frac{1}{2}}$) Additional details on differential charge amplifiers may be found in U.S. Pat. No. 4,242,741.

There may also e seen a preamplifier U1, which serves to invert and amplify the output voltage of a differential charge amplifier and has a adjustment range of 0-60 db in 20 db steps. The total amount of amplification is a function of the sensitivity of the hydrophone being tested (which may change from one type of hydrophone to another type of hydrophone) and the level of any background noise; the amplification should not be so great as to cause the noise to exceed the level detector threshold. A gain of 20 db is normally adequate to amplify a typical hydrophone output to a level which can be detected by level detector or comparator circuit U2. For a 20 db amplification, U2 may be adjusted so that U2 provides a positive output voltage of 5 volts, when the input is negative and exceeds 2.5 volts. Output from the preamplifier is phase shifted by U3 to provide a delayed hydrophone output, which is rectified by U4 and U5. This rectified or negative absolute value is fed to another comparator U6 which serves as a level detector. For a 20 db amplification, U6 may be adjusted so that U6 provides a positive output voltage of 5 volts, when the input is negative and exceeds 2.5 volts. U2 and U6, as well as U4 and U5, are inverting operational amplifiers. The output from the level detector U2 is used as a "D" input to flip-flop U7. The output from level detector U6 with additional gating is used as the clock "ck" input U7.

The "D" input of flip-flop U7 will be true only when the polarity is correct, but the "ck" input of U7 will go "true" whether the polarity is correct or reversed; thus, there is a simple means of determining the correct polarity. The "Q" output of U7 at pin 01 will go "true" for the proper connections but will remain "false" for reversed connections.

The "Q" output of U8 at pin 13 will go "true" anytime it gets a clock signal on its clock "ck" input at pin 11 of U8 because the "D" input at pin 09 of U8 is always true. When pin 13 of U5 goes true it starts timer U9 which is pin-programmed for a preselected delay of 0.5 seconds, although other time delays may be preselected by appropriate pin-programming of U9. When U9 has measured its preselected delay time and times out, its output at pin 9 goes true and that signal is inverted twice at gates U10 and U11 to reset the flip-flops U7 and U8. During the 0.5 second when the timer is counting, the "Q" output at pin 12 of U8 locks out any other clock pulses (i.e. any other hydrophone half cycles of sufficient amplitude) that might be generated after the first one that was detected. A power clear circuit of C1 and R16 is used to initialize the flip-flops in their reset state when power is first applied.

Output pin 01 of U7 is used as a gating signal for transistor switch U12. Transistor U12 will turn on when the polarity is correct and remain on for 0.5 seconds and then go off. If a suitable audible device (i.e. Sonalert) is connected to U12, a half second beep will sound each time the hydrophone is pulsed while it is properly connected. Conversely, if the polarity is incorrect, no sound will be heard when the hydrophone is pulsed. However, the time for the beep may be reduced to about one-quarter of a second. The time for the beep or visual signal should be long enough to allow for the hydrophone signal to damp out and long enough for the operator to hear or see.

Voltage converter U13 generates a negative voltage level equal to the battery voltage, and plus and minus regulators U14 and U15 stabilize these to ±5 volts.

The pre-amplifier is preferably an Analog Devices AD524 instrumentation amplifier and the operational amplifiers are preferably Precision Monolithics OP-420 quad micropower op-amps, except for the operational amplifiers in the charge amplifier portion of the circuit, which are preferably Linear Technology Lt1012 op-amps. The timer is preferably an Epson 8640-A clock pulse generator and the comparator is preferably a Solid State Scientific 4013B dual D-type flip-flop. The Nand Gates are preferably Solid State Scientific 4011B quad Nand Gates and the output transistor is preferably an International Rectifier 1RFD111 hexfet transistor. The voltage converter is preferably a Maxim ICL 7660 and the voltage regulators are preferably National Semiconductor LM78L05(+5V) and LM79L05(−5V). The output device is preferably a Sonalert SC628 by Mallory.

FIGS. 3 A-F illustrate the various expected wave forms at the selected test points A-H indicated in the circuitry illustrated in FIG. 2 for a positive pressure pulse applied to the exterior surface of a hydrophone whose correct positive terminal is connected to input 1 of J1. More particularly, FIG. 3A illustrates the expected amplified output of a hydrophone, and corresponds to the test point marked A in FIG. 2. In particular, it may be seen that the hydrophone signal is inverted and the first half cycle occurs between time $T_0$ and $T_1$ and has a maximum amplitude of "SV" volts. FIG. 3B illustrates the expected output signal from level detector U2, and corresponds to the testpoint marked B in FIG. 2. In particular, it may be seen that level detector U2 provides a positive output for a negative input and has a constant voltage output as long as the signal of FIG. 3A exceeds a preselected threshold amplitude. FIG. 3C illustrates the expected phase shifted (delayed) output (by phase $\phi$) from phase shifter U3. FIG. 3D illustrates the expected output from level detector U6 and depicts one pulse. In particular, it may be seen that level detector U6 provides a positive output (for a negative input) and has a constant voltage output as long as the signal from U5 exceeds a preselected threshold amplitude. FIG. 3E illustrates the expected "clock" input to comparator U7. FIG. 3F illustrates the expected reset signal from inverter U10 caused by timer U9.

Thus, it may be seen that the present invention automatically determines the polarity of the hydrophone relative to its indicated or assumed polarity with minimal judgement or attention by an operator. The invention employs an appropriate pressure pulse to generate a signal from the hydrophone which is amplified (or conditioned and amplified) and then divided into two signals to provide a comparison signal and a polarity dependent signal to a comparator which may provide an appropriate output, which may be an audible and/or visible signal, when the polarity is correct.

Many other variations and modifications may be made in the apparatus and techniques hereinbefore described by those having experience in this technology, without departing from the concepts of the present invention. Accordingly, it should be clearly understood that the apparatus and methods depicted in the accompanying drawings and referred to in the foregoing description are illustrative only and are not intended as limitations on the scope of the present invention.

What is claimed is:

1. A method for determining the amplitude and polarity of a hydrophone relative to its marked or assumed polarity, comprising:

generating an output signal from such a hydrophone by pulsing such a hydrophone with a pressure in a predetermined manner, amplifying the output signal of such a hydrophone, dividing said amplified output signal into a first and second signal, delaying and rectifying said first signal, first comparing said second signal with a preselected voltage level and polarity and generating a third signal when said second signal exceeds said preselected voltage level and matches said preselected polarity, and comparing said output signal and polarity thereof with the output signal and polarity expected from such a hydrophone having a polarity corresponding to said marked or assumed polarity pulsed in said predetermined manner by comparing the polarity of said third signal and said rectified first signal and generating a fourth signal if polarities are the same, and generating an output responsive to said comparing step when said output signal and polarity substantially conform to said expected output signal and polarity by generating a final signal responsive to the generation of said fourth signal, for a preselected time.

2. A method for determining the amplitude and polarity of a hydrophone relative to its marked or assumed polarity comprising:

generating an output signal from a hydrophone by pulsing said hydrophone with a pressure in a predetermined manner, conditioning the output signal of such a hydrophone, amplifying said conditioned output signal, dividing said amplified output signal into a first and second signal, delaying and rectifying said first signal, comparing said second signal with a preselected voltage level and polarity, said preselected voltage level and polarity being representative of an expected voltage level and polarity from such a hydrophone having a polarity corresponding to an assumed polarity when such a hydrophone is pulsed with pressure in said predetermined manner and generating a third signal when said second signal exceeds said preselected voltage level and matches said preselected polarity, and comparing the polarity of said third signal and said rectified first signal and generating a fourth signal if polarities are the same, and generating a final signal responsive to the generation of said fourth signal, for a preselected time to indicate said output signal and polarity substantially conform to said expected output signal and polarity.

3. A method for determining the polarity of a hydrophone relative to its marked or assmed polarity, comprising:

generating an output voltage from such a hydrophone by pulsing such a hydrophone with pressure, amplifying said output voltage, dividing said amplified output voltage into a first and second signal, delaying and rectifying said first signal, comparing said delayed and rectified first signal with first preselected voltage level and generating a third signal when said delayed and rectified first signal exceeds said first preselected voltage level, comparing said second signal with a second preselected voltage level and preselected polarity and generating a fourth signal when said second signal exceeds said second preselected voltage level and matches said preselected polarity, comparing said third and fourth signals and generating a fifth signal when said third and fourth signals are both present, and generating a final signal responsive to said fifth signal, for a preselected time.

4. Apparatus for determining the polarity of a hydrophone relative to its marked of assumed polarity, comprising:

means for amplifying an output signal from a hydrophone pulsed with pressure in a predetermined manner, means for dividing said amplified output signal into a first and second signal, means for delaying and rectifying said first signal, means for comparing said delayed and rectified first signal with a predetermined voltage level and generating a third signal when said delayed and rectified first signal exceeds said preselected voltage level, means for comparing said second signal with a preselected voltage level and preselected polarity, said preselected voltage level and preselected polarity being representative of an expected output signal and polarity from such a hydrophone having a polarity corresponding to an assumed polarity when such a hydrophone is pulsed with pressure in said predetermined manner, and generating a fourth signal when said second signal exceeds said preselected voltage level and matches said preselected polarity, and means for comparing said third and fourth signal and generating a fifth signal if said third and fourth signal are both present, and means for generating a final signal responsive to the generation of said fifth signal, for a preselected time to indicate said output signal and polarity substantially conform to said expected signal and polarity.

5. Apparatus for determining the polarity of a hydrophone relative to its marked or assumed polarity, comprising:

an amplifier of preselectable amplifications connectable to a hydrophone in accordance with a preselected polarity for such a hydrophone to amplify the output signal of such a hydrophone, a phase shifter connected to the output of said amplifier, a first level detector connected to the output of said amplifier, a rectifier connected to the output of said phase shifter, a second level detector connected to the output of said rectifier, a comparator having the outputs of said first and second level detectors as its inputs, an output switch connected to and responsive to said comparator for providing an output signal, a time connected to said comparator for maintaining an output signal from the output switch for a preselected period of time, and an output device connected to said output switch and responsive to said output signal.

6. The apparatus as described in claim 5, further comprising:

a charge amplifier having as its input the output of such a hydrophone and supplying its output as the input to said amplifier.

7. The apparatus as described in claim 5, further comprising:

a step-down transformer having as its input the output of such a hydrophone and supplying its output as the input to said amplifier.

8. The apparatus as described in claim 7, further comprising:

a damping resistor across the primary of said step-down transformer.

9. The apparatus as described in claim 7, further comprising:

a damping resistor across the secondary of said step-down transformer.

10. The apparatus as described in claim 5, further comprising:

a differential charge amplifier having as its input the output of such a hydrophone and supplying its output as the input to said amplifier.

* * * * *